(12) United States Patent
Yamamoto et al.

(10) Patent No.: US 8,517,294 B2
(45) Date of Patent: Aug. 27, 2013

(54) MOTOR VEHICLE FOR COLLECTING PAPER AND HAVING BATTERY TO ASSIST IN PROPULSION

(75) Inventors: David Yamamoto, Paris (CA); Allen Petten, Cambridge (CA); Justin Johns, Hamilton (CA); Sid Vandermeulen, Kitchener (CA); Derek Pepino, Cambridge (CA); Constantin Vasilescu, Cambridge (CA); Laszlo Garda, Cambridge (CA)

(73) Assignee: Shred-Tech Corporation, Ontario (CA)

( * ) Notice: Subject to any disclaimer, the term of this patent is extended or adjusted under 35 U.S.C. 154(b) by 230 days.

(21) Appl. No.: 12/750,447

(22) Filed: Mar. 30, 2010

(65) Prior Publication Data

US 2011/0240778 A1 Oct. 6, 2011

(51) Int. Cl.
*B03B 7/00* (2006.01)

(52) U.S. Cl.
USPC ............. 241/101.2; 241/101.74; 241/101.741

(58) Field of Classification Search
USPC .......................... 241/101.74, 101.741, 101.2
See application file for complete search history.

(56) References Cited

U.S. PATENT DOCUMENTS

| 4,669,674 | A | | 6/1987 | Oldengott et al. |
|---|---|---|---|---|
| 4,785,761 | A | * | 11/1988 | Greenbank ................... 118/682 |
| 4,961,539 | A | * | 10/1990 | Deem ............................. 241/36 |
| 5,226,757 | A | | 7/1993 | Tarrant |
| 5,395,061 | A | * | 3/1995 | Merklinger ............... 241/101.71 |
| 5,803,376 | A | * | 9/1998 | Koyanagi et al. ............... 241/36 |
| 6,119,967 | A | * | 9/2000 | Nakayama et al. ............. 241/34 |
| 6,220,656 | B1 | * | 4/2001 | Martin, Jr. ..................... 296/215 |
| 6,247,233 | B1 | * | 6/2001 | Hinton et al. ................. 29/894.3 |
| 6,398,140 | B1 | | 6/2002 | Stieh et al. |
| 6,413,185 | B1 | * | 7/2002 | Baginski et al. ............... 475/208 |
| 6,588,691 | B2 | | 7/2003 | Yamamoto et al. |
| 6,752,339 | B2 | * | 6/2004 | Moriya et al. ........... 241/101.74 |
| 6,955,311 | B2 | * | 10/2005 | Moro et al. ............. 241/101.741 |
| 7,198,213 | B2 | | 4/2007 | Kolbet et al. |
| 7,211,747 | B2 | | 5/2007 | Hagen et al. |
| 7,618,000 | B2 | * | 11/2009 | Rajewski ........................ 241/36 |
| 7,673,826 | B2 | * | 3/2010 | Kolbet et al. .......... 241/101.741 |
| 7,688,223 | B2 | * | 3/2010 | Magens et al. ................ 340/905 |

(Continued)

OTHER PUBLICATIONS

AXO 408 Hygen, The Hygen "Hybrid Shredding System", available at www.axo-shredders.comlpdf/AXO_Hygen_SpecSheet.pdf, May 4, 2007 (with Document Properties), 5 pages.

(Continued)

*Primary Examiner* — Bena Miller
(74) *Attorney, Agent, or Firm* — Foley & Lardner LLP

(57) ABSTRACT

A motor vehicle for collecting paper for shredding including an electric motor configured to at least assist in propelling the motor vehicle; a compartment configured to receive paper; at least one of a bin lifting device, a shredder mechanism, a conveyance device, and a dumping device; and at least one battery. The bin lifting device is configured to lift a bin and deposit the paper in the compartment, the shredder mechanism is configured to shred the paper in the compartment, the conveyance device is configured to transport the paper from a first location to a second location within the compartment, and the dumping device is configured to discharge the paper from the compartment. The at least one battery is configured to power (i) the electric motor and (ii) the at least one of the bin lifting device, the shredder mechanism, the conveyance device, and the dumping device.

18 Claims, 9 Drawing Sheets

(56) References Cited

U.S. PATENT DOCUMENTS

| | | | |
|---|---|---|---|
| 7,757,987 B2* | 7/2010 | Kolbet et al. | 241/101.2 |
| 7,975,735 B2* | 7/2011 | Bergeron et al. | 144/335 |
| 8,220,236 B1* | 7/2012 | Benner et al. | 56/63 |
| 8,234,031 B2* | 7/2012 | Jerwick | 701/22 |
| 2004/0035962 A1* | 2/2004 | Moro et al. | 241/101.74 |
| 2006/0113412 A1* | 6/2006 | Umeda et al. | 241/101.74 |
| 2007/0152088 A1 | 7/2007 | Kolbet et al. | |
| 2008/0185464 A1 | 8/2008 | Nitta | |
| 2009/0057449 A1* | 3/2009 | Forte et al. | 241/101.74 |
| 2009/0152384 A1* | 6/2009 | Kolbet et al. | 241/101.741 |

OTHER PUBLICATIONS

AXO Has a Truck That Fits Your Business!, available at www.axoshredders.com, 1 page.

AXO HyGen Hybrid, Storage and Destruction Business Magazine, available at http://www.sdbmagazine.comiarticles/article.asp?ID=5655&AdKeyword=axo hygen, dated Oct. 5, 2006, 3 pages.

AXO Hygen Hybrid, Specification, available at www.axo-shredders.com, 2 pages.

AXO Introduces New Mobile Shredders, Recycling Today Magazine, available at http://www.recyclingtoday.com/news/news.asp?ID=9797, dated Jun. 5, 2006, 2 pages.

AXO Introduces New Mobile Shredders, Storage and Destruction Business Magazine, available at http://www.sdbmagazine.com/news/news.asp?ID=7743&AdKeyword=axo, dated Jun. 5, 2006, 2 pages.

Freightliner Business Class® M2, www.M2TOTHEMAX.com. 16 pages.

The AXO Hygen Hybrid, Overview, available at www.axo-shredders.com, 1 page.

AXO Introduces New Mobile Shredders, www.sdbmagazine.com, Sep./Oct. 2006, 2 pages.

US Notice of Allowance dated Jul. 9, 2012 as received in corresponding U.S. Appl. No. 12/749,936.

US Office Action dated Mar. 2, 2012 as received in corresponding U.S. Appl. No. 12/749,936.

US Office Action dated Nov. 15, 2011 as received in corresponding U.S. Appl. No. 12/749,936.

We Have a Truck That Fits Your Business, available at www.axoshredders.com/pdf/AXO_Mobile_Flyer.pdf, Apr. 18, 2007 (with Document Properties), 3 pages.

"International and Eaton Team on Diesel Hybrid Truck for Utilities" Oct. 16, 2004, Green Car Congress, http://www.greencarcongress.com/2004/10/international_a.html.

"Utilities Testing Diesel Hybrid Trouble Trucks" Green Car Congress, May 9, 2005, http://www.greencarcongress.com/2005/05/utilities_testi.html.

Bohlmann et al., "Electric Hybrids May be Grabbing Headlines but Carry More Weight", Machine Design, Dec. 13, 2007, pp. 72-76.

Kolman, "Pioneers of the Hybrid Industry", Utility Products magazine; Sep. 1, 2009; http://www.utilityproducts.com/articles/print/volume-6/issue-9/product-focus0/vehicles-_amp_accessories/pioneers-of_the_hybrid.html.

Overstreet, "Hybrid Bucket Trucks Gaining Traction", Dec. 1, 2008; http://www.utilityproducts.com/articles/print/volume-5/issue-12/product-focus/vehicles-accessories/hybrid-bucket-trucks-gaining-traction133.html.

* cited by examiner

MOTOR VEHICLE FOR COLLECTING PAPER AND HAVING BATTERY TO ASSIST IN PROPULSION

BACKGROUND

1. Field of Embodiments

The disclosed embodiments relate generally to a motor vehicle for collecting paper and having a battery to at least assist in propulsion.

2. Description of Related Art

Trucks often are used to collect large amounts of paper, such as confidential documents, from commercial or residential buildings, shred the collected paper, and transport the shredded paper to a site where the paper is unloaded for recycling, destruction, or other purposes. Such trucks may use on-board auxiliary equipment to load, shred, and unload the paper. Often, the auxiliary equipment is driven by actuators, which in turn are powered by a hydraulic pump connected by a power take-off to an internal combustion engine that provides motive power for the truck. Consequently, the actuators are only capable of driving the auxiliary equipment when the truck engine is running, typically at a speed higher than idle.

Disadvantages can result from the need to keep the internal combustion engine running to load, shred, and unload the paper. For example, the operator(s) performing the loading, shredding, and unloading, as well as anyone else standing near the truck, likely will inhale exhaust fumes, which is unhealthy. The toxic emissions also may be prohibited by jurisdictions having low emission zones. The need to run the engine increases fuel consumption and increases the output of exhaust gases to the atmosphere. Running of the truck engine may be prohibited while the truck is within a building, thus requiring the truck to be positioned outside the building during the loading process. Consequently, the paper must be brought outside the building for loading, which can increase the time needed to load paper into the truck. In addition, the sound generated by the running engine may be objectionable or even prohibited in certain locations. Running the shredding system off the truck engine also adds to wear and tear on the engine (typically shredding time is approximately 25% of the operating time of the vehicle).

Additionally, delays can occur due to the need to run the engine for operation of the shredder. Typically an operator plans a route, drives to a first site and upon arrival configures the truck for shredding. If in a cold environment, the power take-off is engaged and the shredding system is started to warm-up the equipment to an operating temperature. Start of the shredding process is delayed until warm-up is complete. After shredding is completed at the site, the truck is closed and locked, and the operator proceeds to the next site. Subsequent material collection and shredder operation are similar throughout the route. If cool down occurs between sites, it is necessary to repeat warm-up, with the associated delays.

A need exists for improved technology, including technology that may address one or more of the above-described disadvantages of conventional trucks.

SUMMARY

One embodiment relates to a motor vehicle for collecting paper for shredding including an electric motor; a compartment; at least one of a bin lifting device, a shredder mechanism, a conveyance device, and a dumping device; and at least one battery. The electric motor is configured to at least assist in propelling the motor vehicle. The compartment is configured to receive paper. The bin lifting device is configured to lift a bin and deposit the paper in the compartment. The shredder mechanism is configured to shred the paper in the compartment. The conveyance device is configured to transport the paper from a first location to a second location within the compartment. The dumping device is configured to discharge the paper from the compartment. The at least one battery is configured to power both (i) the electric motor and (ii) the at least one of the bin lifting device, the shredder mechanism, the conveyance device, and the dumping device.

Another embodiment relates to a motor vehicle for collecting paper for shredding, including an internal combustion engine, an electric motor, a compartment, a shredder mechanism, and at least one battery. The internal combustion engine is configured to at least assist in propelling the motor vehicle. The electric motor is configured to at least assist in propelling the motor vehicle. The compartment is configured to receive paper. The shredder mechanism is configured to shred the paper in the compartment. The at least one battery is configured to power the electric motor.

BRIEF DESCRIPTION OF THE DRAWINGS

These and other features, aspects, and advantages of the disclosed embodiments will become apparent from the following description, appended claims, and the accompanying exemplary embodiments shown in the drawings, which are briefly described below.

DETAILED DESCRIPTION OF THE PREFERRED EMBODIMENTS

Figure 1:
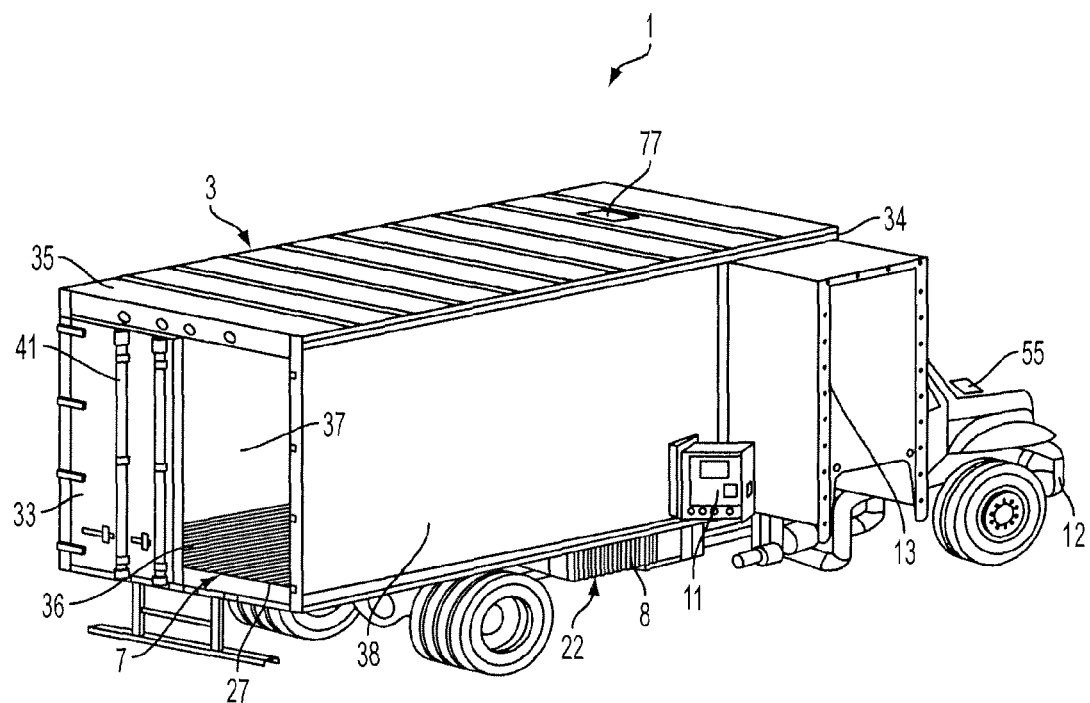
FIG. 1 is a side perspective view of an embodiment of a collection and shredding truck.

Preferred embodiments are illustrated in the drawings. The same or like reference numbers throughout the drawings are used in this description to refer to the same or like parts.

Figure 8:
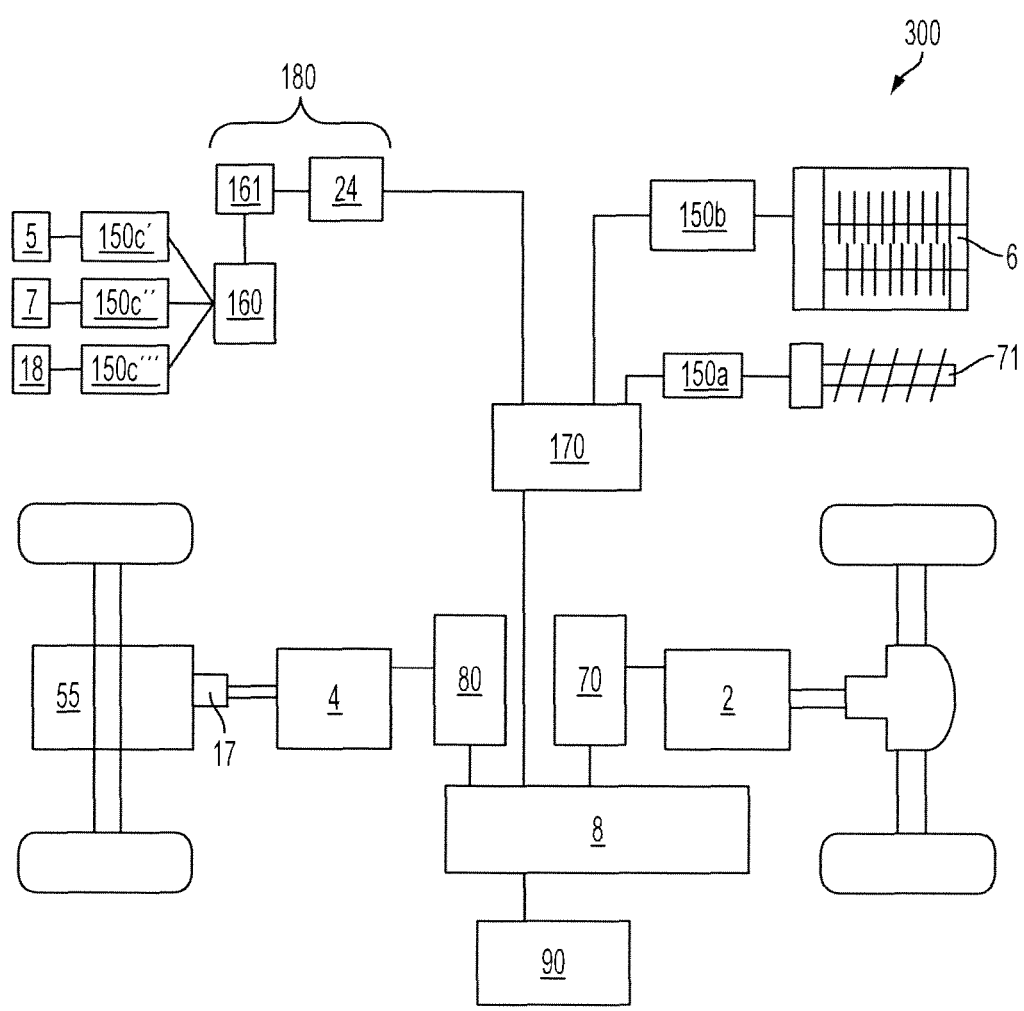
FIG. 8 is a schematic diagram of an embodiment of a series hybrid system for powering the collection and shredding truck of FIG. 1 and its auxiliary equipment.
Figure 9:
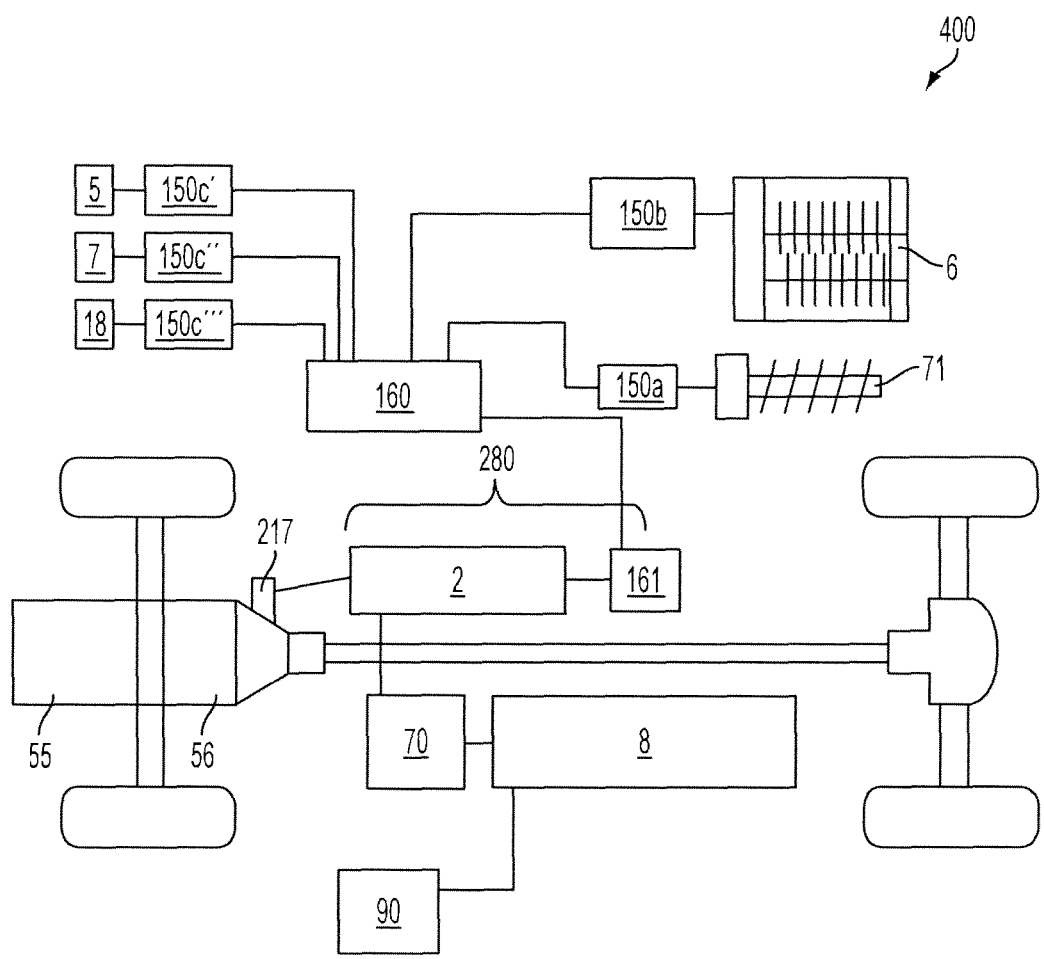
FIG. 9 is a schematic diagram of an embodiment of a parallel hybrid system for powering the collection and shredding truck of FIG. 1 and its auxiliary equipment.
Figure 10:
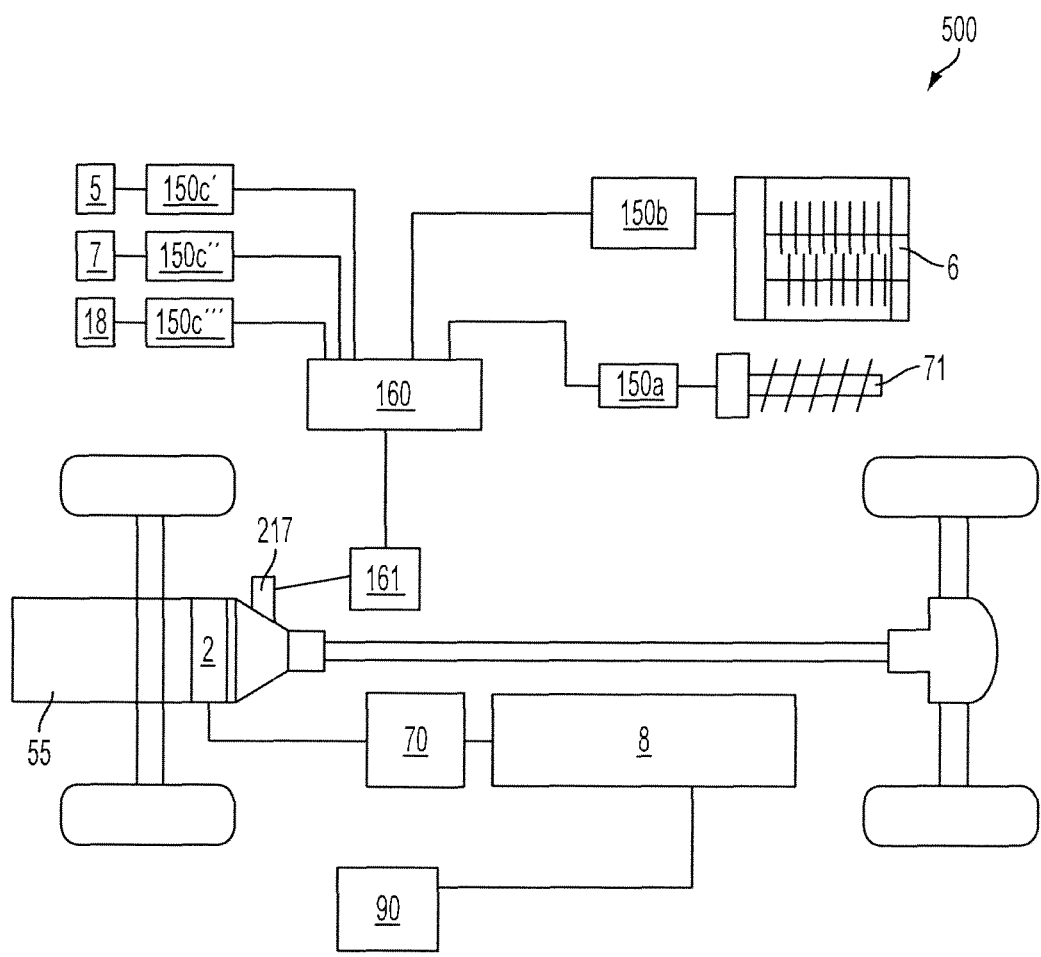
FIG. 10 is a schematic diagram of an embodiment of a parallel hybrid system for powering the collection and shredding truck of FIG. 1 and its auxiliary equipment.

FIGS. 1-5 illustrate an embodiment of a motor vehicle 1 that is capable of collecting and shredding paper. Embodiments of a series hybrid system 300 and parallel hybrid systems 400 and 500 for use with the motor vehicle are shown in FIGS. 8, 9, and 10, respectively. Though the motor vehicle 1 is preferably a truck, other types of vehicles could be used. The motor vehicle 1 may include an electric motor 2, a compartment 3, auxiliary equipment, and at least one battery 8 configured to power the electric motor 2 and preferably the auxiliary equipment. The motor vehicle 1 preferably also includes a chassis 12, which can form the frame of the motor vehicle 1 to hold the various components.

The motor vehicle 1 preferably is a hybrid vehicle, e.g., including an internal combustion engine 55, as well as the electric motor 2, to at least assist in propulsion of the motor vehicle 1. For example, both the electric motor 2 and the internal combustion engine 55 may be used in combination to directly propel the motor vehicle 1. At other times, the propulsion may be provided by either of the internal combustion engine 55 and the electric motor 2 alone. The electric motor 2 optionally could be used to start the internal combustion engine 55 without the aid of a starter (not shown). The electric motor 2 optionally could be used as a generator during vehicle braking to generate power to recharge the battery 8.

The compartment 3 of the motor vehicle 1 is configured to receive and hold paper immediately after it has been deposited into the motor vehicle 1 and after it has been shredded. The compartment 3 may include one or more sub-compartments. For example, the compartment 3 may include a shredding compartment 31 (or payload storage compartment) and a collection compartment 32 (or paper storage area), which may be separated by any suitable divider 179. The shredding compartment 31 may receive and hold the paper immediately after it has been deposited into the motor vehicle 1 and may also house the auxiliary equipment that shreds the paper. The collection compartment 32 may receive the paper after it has been shredded in the shredding compartment 31. The divider 179 may include an opening 82 (see FIG. 5) that allows paper from the shredding compartment 31 to enter the collection compartment 32.

Figure 2:
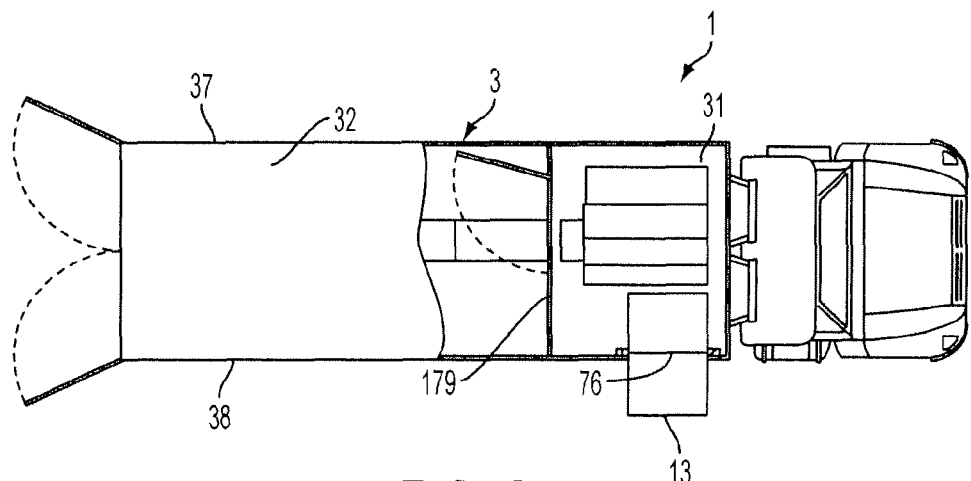
FIG. 2 is a top view of the collection and shredding truck of FIG. 1.

The compartment 3 preferably includes a back wall 33, a front wall 34, a ceiling 35, a bottom wall or floor 36, and two side walls 37, 38. The compartment 3 can include one or more openings 76, 77 to allow paper outside the motor vehicle 1 to be loaded into the interior of the compartment 3. Preferably, the opening 76 is located in one of the side walls, e.g., side wall 38 as shown in FIG. 2. The opening 77 could be provided in alternative or additional locations, such as the ceiling 35 of the compartment 3. In addition, the compartment 3 preferably is configured to allow easy discharge of the paper from the compartment 3. For example, the back wall 33 can be configured to be opened or can include a door or hatch 41 that can be opened to allow paper to be discharged from the compartment 3. Any suitable mechanism may be used to open the back wall 33 or the door 41. Alternatively, the back wall 33 or door 41 may be manually opened by an operator.

The auxiliary equipment may include at least one of a bin lifting device 5, a shredder mechanism 6, a conveyance device 7, and a dumping device 18. The auxiliary equipment can be used to deposit paper into the compartment 3, shred paper within the compartment 3, transport paper within the compartment 3, and/or discharge paper from the compartment 3. However, it is not required that the motor vehicle 1 have all such auxiliary equipment or that the auxiliary equipment perform all of these functions. For example, one or more of the functions could be performed manually or through other means.

The bin lifting device 5 is configured to deposit paper into the compartment 3 by lifting a bin 51 at least partially filled with paper and depositing that paper into the compartment 3. The bin lifting device 5 lifts the bin 51 from the outside of the compartment 3 and inserts it at least partially within the inside of the compartment 3 through the opening 76. While lifting the bin 51 into the compartment 3, the bin lifting device 5 tips the bin 51, thereby causing any paper located in the bin 51 to deposit into the compartment 3. The paper may also be deposited into a first end 61 of a hopper 10 (see FIG. 5) located within the compartment 3 and exit the hopper 10 through a second end 62 of the hopper 10 to the shredder mechanism 6, also located within the compartment 3. Any suitable type of the hopper 10, for example a vibrating Bridgeless Feed Hopper™, may be used. After loading the paper into the compartment 3, the bin lifting device 5 retracts the bin 51 and places the bin 51 outside of the compartment 3 and onto the floor or the ground.

Figure 3:
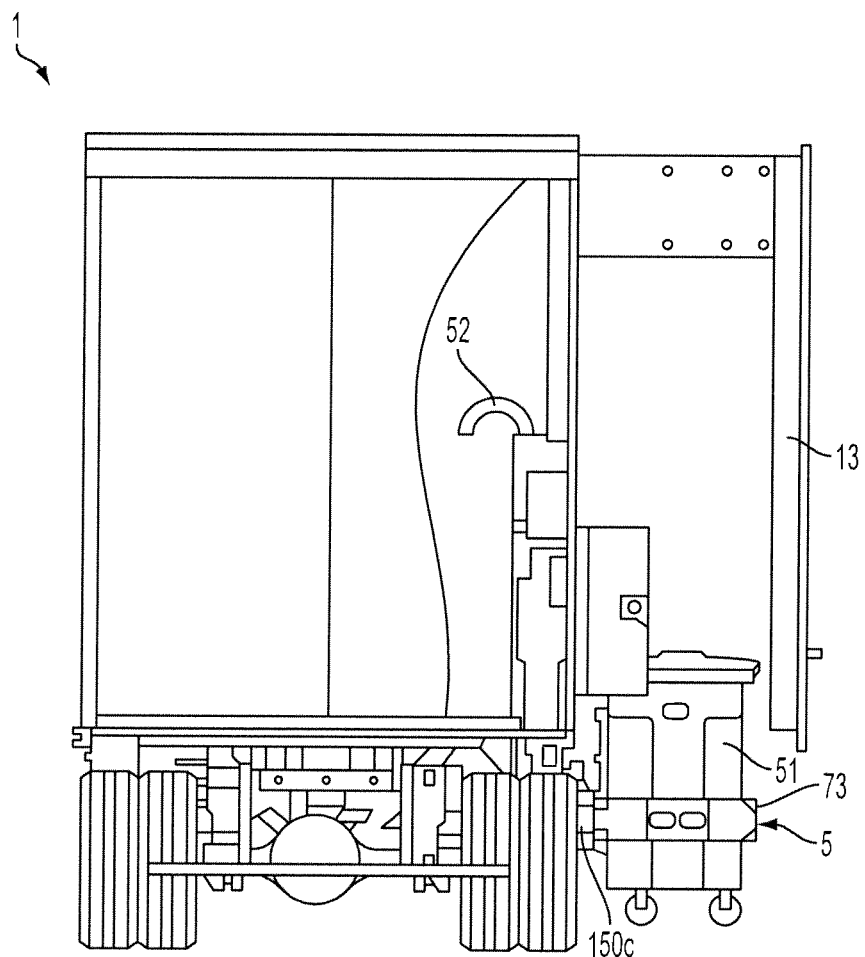
FIG. 3 is a rear view of the collection and shredding truck of FIG. 1 with a partially cut-out view showing components of the bin lifting device.

The bin lifting device 5 may be any suitable mechanism. For example, as shown in FIG. 3, the bin lifting device 5 may be a gripper 5 including two gripping arms 73 and a chain driven lift mechanism (not shown) to carry the bin 51 vertically up and then over a top portion 52 of the bin lifting device 5 to overturn the bin 51 and deposit the contents of the bin 51 into the compartment 3. Another example (not shown) of a bin lifting device 5 includes a pair of guide rails integrated with a pair of chains, where the chains operate to drive a carriage that is coupled to the bin 51 to move it from outside of the compartment 3 to inside of the compartment 3. Such a bin lifting device 5 is described in U.S. Pat. No. 7,211,747, filed on Aug. 25, 2004, which is incorporated herein by reference in its entirety. The bin lifting device 5 can be configured to unload paper from one bin 51 at a time or from multiple bins 51 simultaneously.

The bin lifting device 5 can be driven by an actuator 150c. Any suitable actuator 150c may be used to drive the bin lifting device 5. For example, the actuator 150c may be one of a hydraulic device and an electric motor. Preferably, the actuator 150c is a hydraulic device such as a hydraulic cylinder or a hydraulic motor mounted at the bottom of a bin lifter track support that drives the bin lifter up and down. The actuator 150c powers the gripper 5 through control valve 160. Preferably, the bin lifting device 5 is configured to unload bin(s) 51 with a weight of approximately 250-300 lbs. within a cycle time of 25 seconds and is driven at a constant speed.

An enclosure 13 preferably is provided to prevent an operator from being caught in the bin lifting device 5 or bin 51 during loading and unloading of the paper and to protect the paper from being exposed to the environment and prevents the paper from escaping to protect confidentiality. The enclosure 13 may cover both the bin lifting device 5 and the opening 76 in the compartment 3. The enclosure 13 is typically three sided. The actual size of the enclosure 13 is determined by the total size of the bin(s) 51 to be unloaded, the size of the bin lifting device 5, and the desired amount of coverage for the bin(s) 51 and the bin lifting device 5. The enclosure 13 can be a conventional mechanism that is extended from the side of the compartment 3 during the unloading of the bin(s) 51 and retracted back into the side of compartment 3 after the bin(s) 51 have been unloaded. When the enclosure 13 is retracted, the width of the motor vehicle 1 is a legal width for travel on public roads. Any suitable mechanism can be used to cause the enclosure 13 to extend from and retract into the side of the compartment 3. For example, the enclosure 13 may be pushed in and out of the compartment 3 by hand on a rail system. An example of such an enclosure 13 may be found in U.S. Pat.

No. 6,588,691, filed on Aug. 31, 2001, which is incorporated herein by reference in its entirety.

The shredder mechanism 6 is configured to shred the paper in the compartment 3. The shredder mechanism 6 shreds the paper deposited into the compartment 3 by the bin lifting device 5. After shredding the paper, the shredded paper may be transported by the conveyance device 71. If the compartment 3 includes a shredder compartment 31 and a collection compartment 32, the shredder mechanism 6 may shred the paper in the shredder compartment 31 and the shredded paper may be transported to the collection compartment 32, for holding purposes, by the conveyance device 71.

Figure 5:
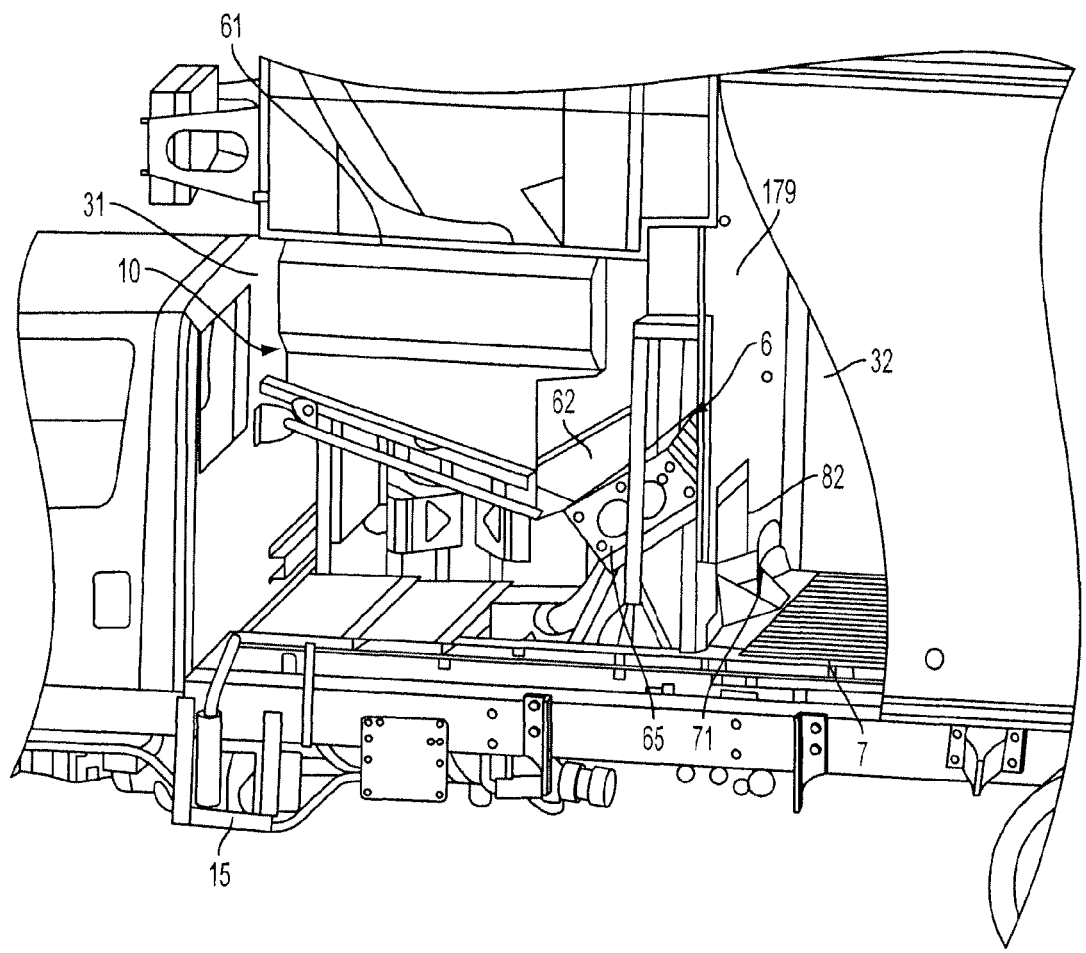
FIG. 5 is a side, cut-away view of a portion of the collection and shredding truck of FIG. 1 showing a shredder mechanism within a compartment.

The shredder mechanism 6 may be any suitable mechanism. For example, as shown in FIG. 5, the shredder mechanism 6 may include a shredder 65 of any suitable type, such as a ST-15 shear shredder, a ST-25 shear shredder, or a ST-35 shear shredder. Another example (not shown) of a shredder mechanism includes high speed hammermills and single rotor shredders.

The shredder mechanism 6 may be driven by an actuator 150b schematically represented in FIGS. 8 and 9. Any suitable actuator may be used to drive the shredder mechanism 6. For example, the actuator may be one of a hydraulic device, such as a hydraulic motor, and an electric motor.

Figure 4:
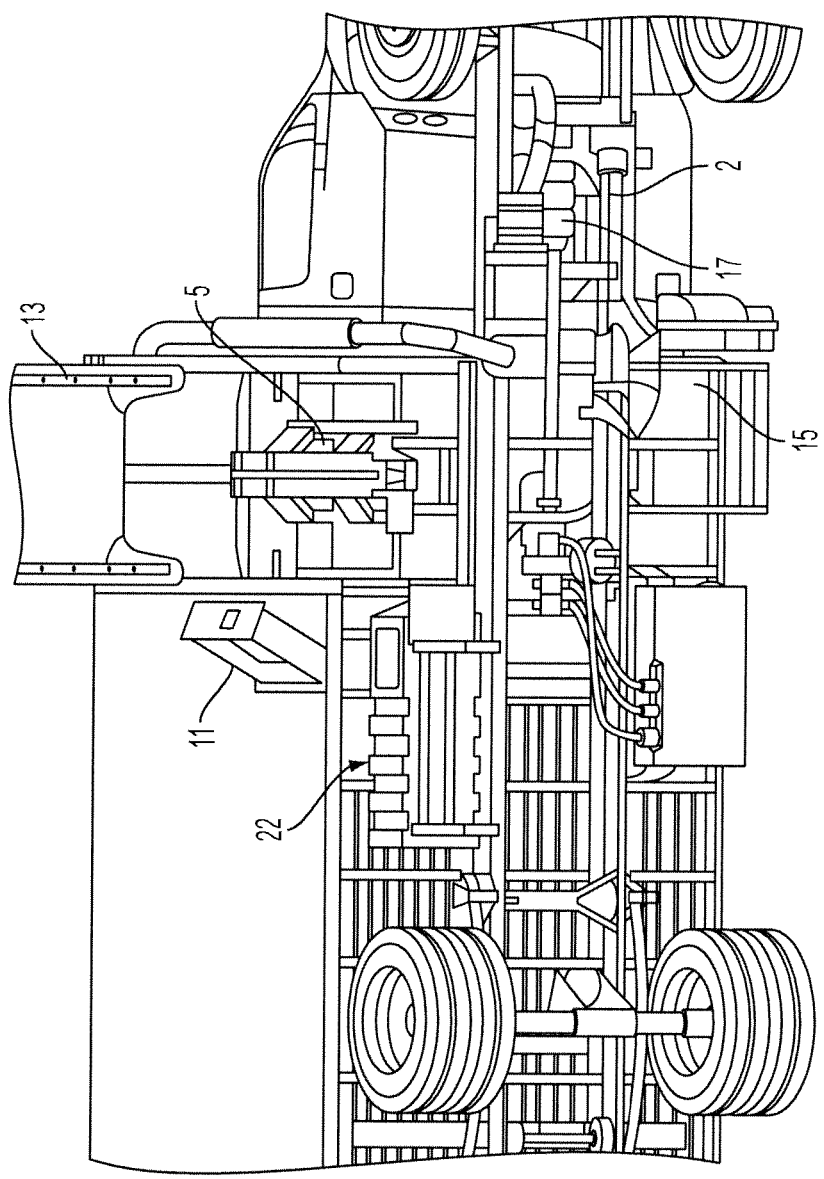
FIG. 4 is a bottom perspective view of a portion of the collection and shredding truck of FIG. 1.

The shredder mechanism 6 may be controlled by a control panel 11 (see FIGS. 1 and 4). The control panel 11 may be manually operated, by an operator, or automatically operated.

The conveyance device is configured to transport the paper from a first location to a second location within the compartment 3. For example, the conveyance device can transport the paper loaded into the compartment 3 from a loading location near the front wall 34 to a more rearward location in the compartment 3. By moving the paper rearward, clearance is provided to allow for the loading of additional paper into the compartment 3. As a further example, the conveyance device can be configured to assist in unloading the paper from the compartment 3. In particular, the conveyance device can be used to move the paper toward an opening or exit of the compartment 3 to discharge the paper from the compartment. As yet another example, the conveyance device can be used to convey shredded paper toward a rear of the compartment with enough force to compact the shredded paper. The conveyance device can be any mechanism suitable for the intended use. For example, the conveyance device may be at least one of a moving floor 7 and an auger 71.

An exemplary moving floor 7, as shown for example in FIG. 1 (in this figure, a door has been omitted for ease of illustration), may include a plurality of axially extending, parallel slats 27. The parallel slats 27 may be arranged in groups, where each of the parallel slats 27 making up a group are fixed together so that they move in the same direction and at the same time as all of the other slats in their group. An example of a moving floor 7 including separately grouped slats 27 is described in U.S. application Ser. No. 11/685,925, filed on Mar. 14, 2006, which is incorporated herein by reference in its entirety. As yet another example, the moving floor 7 may include one or more conveyance device belts. Preferably, the moving floor 7 is a Keith Walking Floor.

The moving floor 7 can be driven by an actuator 150c, schematically represented in FIGS. 8, 9, and 10. Any suitable actuator 150c, such as one of a hydraulic device and an electric motor, may be used to drive the moving floor 7. Preferably, the actuator 150c is a hydraulic device such as a hydraulic motor. Preferably, the moving floor 7 is also configured to discharge the paper from the compartment 3 within approximately 6 to 15 minutes at a constant speed.

An exemplary auger 71, as shown in FIG. 5, may transport paper from one portion of the compartment 3 to another portion of the compartment 3. For example, if the compartment 3 includes a shredding compartment 31 and collection compartment 32, the auger 71 may transport the shredded paper from the shredding compartment 31 to the collection compartment 32 via the opening 82 in the divider 179. The auger 71 may also create pressure that is exerted on the paper transported by the auger 71 from one portion of the compartment 3 to another portion of the compartment 3, such that the paper in the other portion of the compartment 3 is compacted together.

The auger 71 can be driven by an actuator 150a schematically represented in FIGS. 8, 9, and 10. Any suitable actuator, such as one of a hydraulic device, for example a hydraulic motor, and an electric motor, may be used to drive the auger 71.

Figure 6:
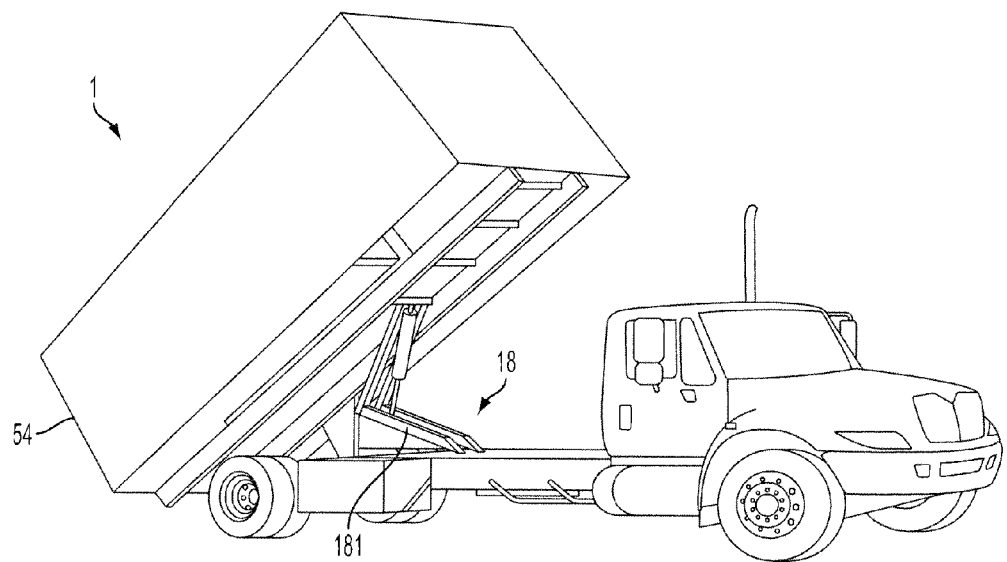
FIG. 6 is a side, perspective view of an embodiment of a dumping device, in a discharge position, that can be used with the collection and shredding truck of FIG. 1.
Figure 7:
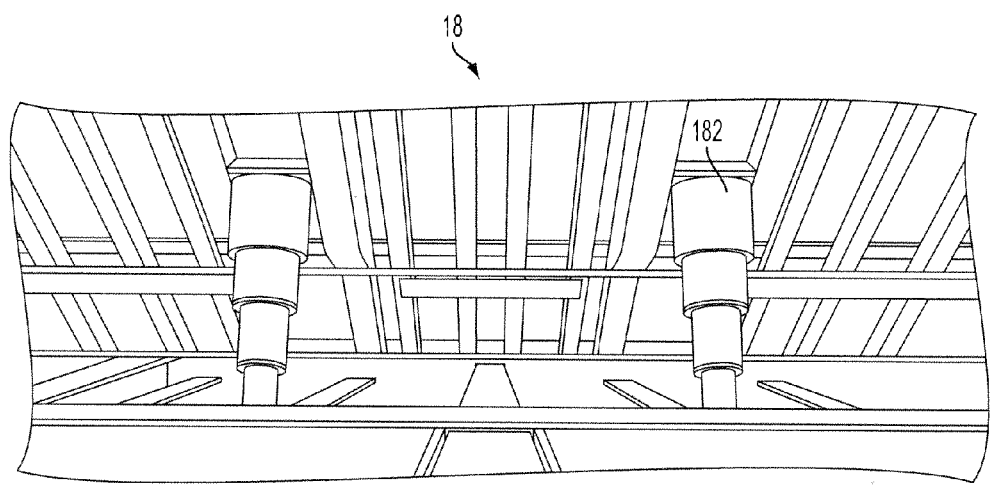
FIG. 7 is a rear view of another embodiment of a dumping device, in a discharge position, that can be used with the collection and shredding truck of FIG. 1.

The dumping device 18 includes an actuator configured to cause the discharge of paper from the compartment 3. The actuator of the dumping device 18 preferably is configured to raise a portion of the compartment 3 (see FIGS. 6-7) to cause the paper to move out of the compartment 3 due to gravitational force. For example, the dumping device 18 may be a scissor lift 181, such as for example shown in FIG. 6, or a telescopic cylinder 182, such as for example shown in FIG. 7, that tilts the compartment 3 to a desired dump angle. The dumping device 18 can be driven by the actuator 150c shown in FIGS. 8, 9, and 10.

The at least one battery 8 can be configured to power both (i) the electric motor 2 and (ii) the auxiliary equipment in a series hybrid system 300 (FIG. 8) and in a parallel hybrid system 400 (FIGS. 9) and 500 (FIG. 10). The at least one battery 8 is configured to power the auxiliary equipment by powering an actuator of the auxiliary equipment described above. Preferably, the at least one battery 8 powers the auxiliary equipment while the motor vehicle 1 is stationary, such as when the motor vehicle 1 is located at a site. The at least one battery 8 will hereinafter be referred to simply as the battery 8 for ease of description, unless it is necessary to refer to individual batteries.

Both in a series hybrid system 300 and a parallel hybrid system 400, 500, the auxiliary equipment may be powered even when the internal combustion engine 55 is not running. The internal combustion engine 55 can be controlled by a control system (not shown, but known to one skilled in the art) to automatically turn on at a first predetermined point, preferably corresponding to the need to charge the battery 8. When the internal combustion engine 55 turns on, the battery 8 will be charged until a second predetermined point, preferably corresponding to the battery 8 being sufficiently charged such that the battery 8 can power the auxiliary equipment for a sufficient period of time without the internal combustion engine 55. At the second predetermined point, the control system can turn off the internal combustion engine 55.

In a series hybrid system 300, an embodiment of which is shown in FIG. 8, the chassis 12 may hold the internal combustion engine 55, a mechanical link 17, a generator 4, the electric motor 2, the battery 8, and auxiliary equipment, such as the shredder mechanism 6, the auger 71, the bin lifting device 5, the moving floor 7, and the dumping device 18. The battery 8 may provide power to both the electric motor 2, so that it can at least assist in propulsion of the motor vehicle 1, and to the auxiliary equipment.

The battery 8 may be charged by the generator 4 when the internal combustion engine 55 is running. The internal combustion engine 55 may connect and provide power to the generator 4 via the mechanical link 17, which transfers force from the internal combustion engine 55 to the generator 4. Upon receiving the force from the mechanical link 17, the generator 4 may charge the battery 8 via a generator controller 80. Preferably, the generator controller 80 is capable of controlling, monitoring, and communicating all aspects of the operations of the generator 4. For example, the generator controller 80 may control the amount of charge that the generator 4 provides to charge the battery 8 while the internal combustion engine 55 is running. If desired, the internal combustion engine 55 may be used only to charge the battery 8, and not to directly assist in propulsion of the motor vehicle 1.

The battery 8 may also be charged by an electrical outlet 90, regardless of whether the internal combustion engine 55 is running. This configuration allows for the battery 8 to be charged at a home location, a worksite, or other similar locations.

The battery 8 may power the electric motor 2 via a first motor controller 70 that is capable of governing the performance of the electric motor 2. For example the first motor controller 70 may connect the electric motor 2 to the battery 8 so that the electric motor 2 can receive power from the battery 8. As yet another example, the first motor controller 70 may include a manual or automatic mechanism to start and stop the electric motor 2, select forward and reverse movement of the electric motor 2, and/or select and regulate the speed of the electric motor 2.

The battery 8 may power the auxiliary equipment, such as the auxiliary equipment described above, via a second motor controller 170. The second motor controller 170 is capable of governing the performance of the actuators 150a, 150b, 150c. For example, it could include a microcomputer. For example, the second motor controller 170 may connect the actuators 150a, 150b, 150c of the shredder mechanism 6, the auger 71, the bin lifting device 5, the moving floor 7, and the dumping device, and to the battery 8 so that the actuators 150a, 150b, 150c can receive power from the battery 8. As yet another example, the second motor controller 170 may include a manual or automatic mechanism to start and stop the actuators 150a, 150b, 150c select forward and reverse movement of the actuators 150a, 150b, 150c; and/or select and regulate the speed of the actuators 150a, 150b, 150c.

Any suitable actuators 150a, 150b, and 150c may be used, and they can be configured in a variety of ways. In the embodiment shown, the actuators 150a, 150b could be electric motors that receive power from the second motor controller 170 to drive the auger 71 and the shredder mechanism 6. In the embodiment shown, the actuator 150c (constituted in this embodiment by individual actuators 150c', 150c", and 150c''') is a hydraulic device. In this configuration, a drive mechanism 180, formed by an electric motor 24 driving a hydraulic pump 161, provides hydraulic force to a valve manifold 160. The valve manifold 160 can be configured to manually or automatically split the power provided by a drive mechanism 180. The drive mechanism 180 can be provided to convert the electrical energy of the battery 8 into a hydraulic force that can drive the hydraulic device. The speed of the electric motor 24 may be controlled by an electronic speed control module (not shown), which allows for control over the speed of the hydraulic device or a fixed displacement pump can be driven off a power take-off with flow controls to control speed. The hydraulic pump 161 is preferably included in a reservoir (not shown) containing a biodegradable hydraulic fluid. The use of biodegradable hydraulic fluid decreases the likelihood that harmful material will be discharged from the motor vehicle 1. Biodegradable hydraulic fluid is also beneficial because it may permit immediate cold operation and dispense with the need for warm-up. The hydraulic pump may be any suitable pump 161. Preferably, the hydraulic pump 161 is a fixed displacement gear pump. Commercially available electric hydraulic pumps supplying up to 8 horsepower could be used. Although shown as electrically driven, the actuators 150a and 150b could be hydraulically driven in a configuration similar to that shown in FIG. 9.

The internal combustion engine 55 may connect to the electric motor 2 via a power take-off 217 to charge the battery 8. The power take-off 217 transfers force from the internal combustion engine 55 to the electric motor 2. Upon receiving the force from the power take-off 217, the electric motor 2, acting as a generator, may charge the battery 8 via a motor/generator controller 70. During braking, the motor/generator controller 70 assists in transferring power from the electric motor 2, acting as a generator, and providing the power to charge the battery 8. The motor/generator controller 70 is capable of controlling, monitoring, and communicating all aspects of the operations of the electric motor 2. For example, the motor/generator controller 70 may control the amount of charge that the electric motor 2, acting as a generator, provides to the battery 8 to charge the battery while the internal combustion engine 55 is running.

The battery 8 also may be charged by an electrical outlet 90 regardless of whether the internal combustion engine 55 of the motor vehicle 1 is running. This configuration allows for the battery 8 to be charged at a home location, a worksite, or any similar location.

The electric motor 2 may receive power from the battery 8 to at least assist in propelling the motor vehicle 1 by driving the front or rear wheels of the motor vehicle 1. Generally, the internal combustion engine 55 is capable of propelling the motor vehicle 1 without the aid of the battery 8 and the electric motor 2. During acceleration of the motor vehicle 1, however, the battery 8 may supply power to the electric motor 2 such that the electric motor 2 assists the internal combustion engine 55 in propelling the motor vehicle 1. Alternatively, the electric motor 2 alone may be used to propel the motor vehicle 1.

The battery 8 may power the auxiliary equipment by powering a drive mechanism 280. The drive mechanism 280 can be provided to convert the electrical energy of the battery 8 into a hydraulic force that can drive the actuators 150a, 150b, 150c. The drive mechanism 280 connects to a valve manifold 160. The valve manifold 160 manually splits the power provided by the drive mechanism 280 between the bin lifting device 5, the moving floor 7, the dumping device, the shredder mechanism 6, and the auger 71. The valve manifold 160 connects to an actuator 150c (in this case, individual actuators 150c', 150c", and 150c''') that drives the bin lifting device 5, the moving floor 7, and the dumping device 18; the actuator 150a that drives the auger 71; and the actuator 150b that drives the shredder mechanism 6. Preferably, the actuators 150a, 150b, 150c of the bin lifting device 5, the moving floor 7, the dumping device 18, the auger 71, and the shredder mechanism 6 are hydraulic devices such as a hydraulic motor. However, some or all of them could be electrically driven motors, having a configuration similar to that shown in FIG. 8.

The drive mechanism 280 may include the electric motor 2 and a hydraulic pump 161, where the battery 8 powers the electric motor 2 connected to the hydraulic pump 161 and the hydraulic pump 161 connects to the valve manifold 160. The fluid could be a biodegradable hydraulic fluid, which decreases the likelihood that harmful material will be discharged from the motor vehicle 1 and may permit immediate cold operation and dispense with the need for warm-up. The hydraulic pump may be any suitable pump 161. Preferably, the hydraulic pump 161 is a multi-stage pump with fixed and variable sections, such as for example an axial displacement pump with fixed gear pumps attached. The hydraulic pump 161 preferably provides fixed flow when the bin lifting device 5, moving floor 7, dumping device 18, and auger 71 are in operation. The hydraulic pump 161 preferably is variable when the shredder mechanism 6 is in operation. Preferably, the hydraulic pump 161 operates at approximately 40 horsepower when it is used to operate the shredder mechanism 6 and may be capable of decreasing displacement when pressure exceeds a preset level. There are many possible pump, control valve, and motor combinations.

In this, and other embodiments, any number of batteries 8 can be used that is capable of powering the auxiliary equipment for preferably at least 85% to 90% of the time needed to power the auxiliary equipment, while the internal combustion engine 55 is not running, for example. Different useful periods of time, while the internal combustion engine 55 is not running could be modified by varying the number of batteries or the draw of equipment. Typically, a plurality of batteries 8 will be used. The batteries 8 may be positioned in any suitable configuration if more than one battery 8 is used to power the actuators.

The battery 8 may be located in any suitable location within or attached to the motor vehicle 1. Preferably, the battery 8 is located in a power electronics carrier 22 that includes the battery 8, connectors (not shown), and relays (not shown), where the power electronics carrier 22 may be, for example as shown in FIG. 1, coupled to the chassis 12 of the compartment 3.

In an alternative parallel hybrid system 500, an embodiment of which is shown in FIG. 10, the chassis 12 may hold an internal combustion engine 55, an electric motor 2 capable of acting as a generator, a battery 8, and auxiliary equipment such as the shredder mechanism 6, the auger 71, the bin lifting device 5, the moving floor 7, and the dumping device 18. The internal combustion engine 55 may drive the electric motor 2, acting as a generator during braking of the motor vehicle 1 to charge the battery 8, or the battery 8 may be charged by an electrical outlet 90.

The internal combustion engine 55 may be directly mechanically connected to the electric motor 2 to charge the battery 8. The electric motor 2, acting as a generator, may charge the battery 8 via a motor/generator controller 70. During braking, the motor/generator controller 70 assists in transferring power from the electric motor 2, acting as a generator, and providing the power to charge the battery 8. The motor/generator controller 70 is capable of controlling, monitoring, and communicating all aspects of the operations of the electric motor 2. For example, the motor/generator controller 70 may control the amount of charge that the electric motor 2, acting as a generator, provides to the battery 8 to charge the battery while the internal combustion engine 55 is running.

The battery 8 also may be charged by an electrical outlet 90 regardless of whether the internal combustion engine 55 of the motor vehicle 1 is running. This configuration allows for the battery 8 to be charged at a home location, a worksite, or any similar location.

The electric motor 2 may receive power from the battery 8 to at least assist in propelling the motor vehicle 1 by driving the front or rear wheels of the motor vehicle 1. Generally, the internal combustion engine 55 is capable of propelling the motor vehicle 1 without the aid of the battery 8 and the electric motor 2. During acceleration of the motor vehicle 1, however, the battery 8 may supply power to the electric motor 2 such that the electric motor 2 assists the internal combustion engine 55 in propelling the motor vehicle 1. Alternatively, the electric motor 2 alone may be used to propel the motor vehicle 1.

The battery 8 may power the auxiliary equipment by driving a drive mechanism, formed by the electric motor 2 a pump 161, through a power take-off 217. The electric motor 2 and pump 161 can convert the electrical energy of the battery 8 into a hydraulic force that can drive the actuators 150*a*, 150*b*, 150*c*. The pump 161 connects to a valve manifold 160. The valve manifold 160 manually splits the hydraulic power between the bin lifting device 5, the moving floor 7, the dumping device 18, the shredder mechanism 6, and the auger 71. The valve manifold 160 connects to an actuator 150*c* (in this case, individual actuators 150*c*', 150*c*", and 150*c*'") that drives the bin lifting device 5, the moving floor 7, and the dumping device 18; the actuator 150*a* that drives the auger 71; and the actuator 150*b* that drives the shredder mechanism 6. Preferably, the actuators 150*a*, 150*b*, 150*c* of the bin lifting device 5, the moving floor 7, the dumping device 18, the auger 71, and the shredder mechanism 6 are hydraulic devices such as a hydraulic motor. However, they could be electrically driven motors, having a configuration similar to that shown in FIG. 8.

The drive mechanism may include the electric motor 2 and a hydraulic pump 161 where the battery 8 powers the electric motor 2 connected to the hydraulic pump 161 and the hydraulic pump 161 connects to the valve manifold 160. The fluid could be a biodegradable hydraulic fluid, which decreases the likelihood that harmful material will be discharged from the motor vehicle 1 and may permit immediate cold operation and dispense with the need for warm-up. The hydraulic pump may be any suitable pump 161. Preferably, the hydraulic pump 161 is a multi-stage pump with fixed and variable sections, such as for example an axial displacement pump with fixed gear pumps attached. The hydraulic pump 161 preferably provides fixed flow when the bin lifting device 5, moving floor 7, dumping device 18, and auger 71 are in operation. The hydraulic pump 161 preferably is variable when the shredder mechanism 6 is in operation. Preferably, the hydraulic pump 161 operates at approximately 40 horsepower when it is used to operate the shredder mechanism 6 and may be capable of decreasing displacement when pressure exceeds a preset level. There are many possible pump, control valve, and motor combinations.

Figure 11:
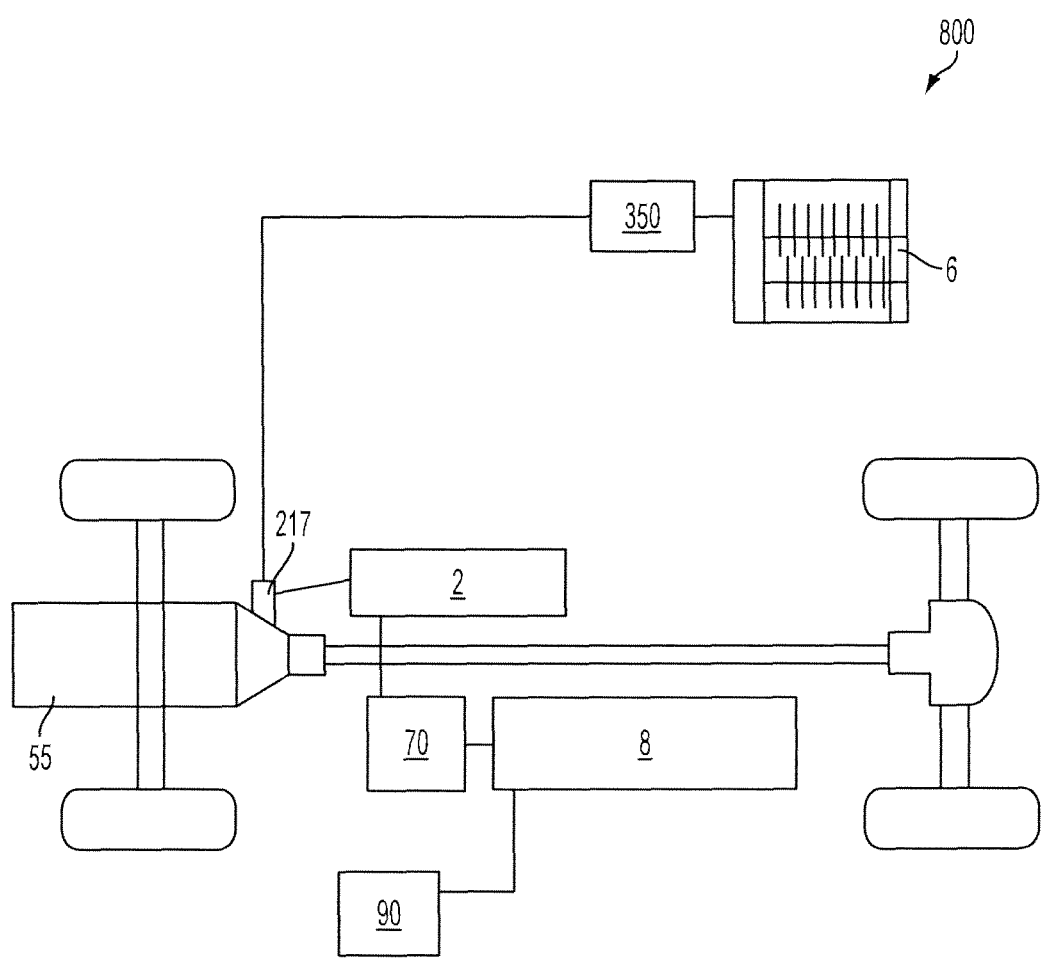
FIG. 11 is a schematic diagram of an embodiment of a parallel hybrid system for powering the collection and shredding truck of FIG. 1, where the battery does not power the auxiliary equipment.

According to an alternate embodiment, as shown in FIG. 11, the electric motor 2 may be powered by a battery 8 to assist in propulsion of the motor vehicle 1, but the auxiliary equipment may be driven only by the internal combustion engine 55. In other words, the electric motor 2 and battery 8 are not used to drive auxiliary equipment. In this embodiment, only a shredder mechanism 6 is illustrated, however it is to be understood that other auxiliary equipment, such as the type described previously, may be included. The battery 8 may power the electric motor 202, that is configured to at least assist in propelling the motor vehicle 1, in a parallel hybrid system 800 (as shown FIG. 11) or a series hybrid system (not shown).

In contrast to prior embodiments, the shredder mechanism 6 (auxiliary equipment) may be powered by something other than the battery 8. For example, the shredder mechanism 6 may be driven by an actuator 350 which is driven by a power take-off 217 from the internal combustion engine 55. The power take-off 217 connects to and receives energy from the internal combustion engine 55 that assists in propelling the motor vehicle 1. Though not shown, a clutch or similar mechanism could be provided between the actuator 350 and the power take-off 217 to allow selective engagement and disengagement of the actuator 350. Alternatively, (not shown) the shredder mechanism 6 may be powered by the internal combustion engine 55 where the internal combustion engine 55 directly powers the actuator 350 that drives the shredder mechanism 6.

One versed in the art would appreciate that there may be other embodiments and modifications within the scope and spirit of the disclosure. Accordingly, all modifications attainable by one versed in the art from the present disclosure, within its scope and spirit, are to be included as further embodiments of the present disclosure. The scope of the following claims and their equivalents is intended to cover such embodiments, modifications, and alternative designs.

What is claimed is:

1. A motor vehicle for collecting paper for shredding, comprising:
    an internal combustion engine configured to propel the motor vehicle;
    an electric motor configured to propel the motor vehicle;
    a compartment configured to receive paper;
    at least one of:
        a bin lifting device configured to lift a bin and deposit the paper in the compartment;
        a shredder mechanism configured to shred the paper in the compartment;
        a conveyance device configured to transport the paper from a first location to a second location within the compartment; and
        a dumping device configured to discharge the paper from the compartment; and
    at least one battery configured to provide power to drive both (i) the electric motor and (ii) the at least one of the bin lifting device, the shredder mechanism, the conveyance device, and the dumping device,
    wherein the internal combustion engine and the electric motor are each configured to independently propel the motor vehicle.

2. The motor vehicle of claim 1, wherein the bin lifting device is configured to lift the bin and the paper to move the bin and the paper from outside of the compartment to inside of the compartment.

3. The motor vehicle of claim 1, wherein the shredder mechanism is configured to shred the paper while the motor vehicle is running.

4. The motor vehicle of claim 1, wherein the conveyance device includes an auger configured to transport the paper.

5. The motor vehicle of claim 1, wherein the conveyance device includes a moving floor configured to transport the paper.

6. The motor vehicle of claim 1, wherein the dumping device tilts the compartment to discharge the paper from the compartment.

7. The motor vehicle of claim 1, wherein the at least one battery powers an actuator configured to drive the at least one of the bin lifting device, the shredder mechanism, the conveyance device, and the dumping device.

8. The motor vehicle of claim 7, wherein the actuator is one of a hydraulic device and an electric motor.

9. The motor vehicle of claim 7, further comprising a first motor controller configured to control the electric motor and a second motor controller configured to control the actuator.

10. The motor vehicle of claim 1, wherein the at least one battery is configured to be charged by at least one of a generator and an electrical outlet.

11. The motor vehicle of claim 10, further comprising a generator controller configured to control flow of current between the generator and the at least one battery.

12. The motor vehicle of claim 1, further comprising a power take-off configured to transfer force from the internal combustion engine to the electric motor, wherein the electric motor is configured to act as a generator and the generator is configured to charge the at least one battery using force transferred from the internal combustion engine.

13. The motor vehicle of claim 1, further comprising a power take-off configured to transfer force from the internal combustion engine to a generator, wherein the generator is configured to charge the at least one battery using force transferred from the internal combustion engine.

14. The motor vehicle of claim 1, wherein the at least one battery is configured to power the at least one of the bin lifting device, the shredder mechanism, the conveyance device, and the dumping device even when the internal combustion is not operating.

15. The motor vehicle of claim 1, wherein the at least one battery is configured to power both the electric motor and the at least one of the bin lifting device, the shredder mechanism, the conveyance device, and the dumping device even when the internal combustion is not operating.

16. The motor vehicle of claim 1, wherein the battery is configured to power the at least one of the bin lifting device, the shredder mechanism, the conveyor, and the dumping device when the internal combustion engine is running.

17. The motor vehicle of claim 1, wherein the at least one battery is configured to provide power to drive the shredder mechanism.

18. A motor vehicle for collecting paper for shredding, comprising:
    an internal combustion engine configured to propel the motor vehicle;
    an electric motor configured to propel the motor vehicle;
    a compartment configured to receive paper;
    a shredder mechanism configured to shred the paper in the compartment; and
    at least one battery configured to provide power to drive the electric motor,
    wherein the internal combustion engine and the electric motor are each configured to independently propel the motor vehicle.

* * * * *